June 28, 1966  F. PAPKE ET AL  3,257,924
RANGE FINDER

Filed May 18, 1964  4 Sheets-Sheet 2

June 28, 1966  F. PAPKE ET AL  3,257,924
RANGE FINDER
Filed May 18, 1964  4 Sheets-Sheet 3

June 28, 1966  F. PAPKE ET AL  3,257,924

RANGE FINDER

Filed May 18, 1964  4 Sheets-Sheet 4

United States Patent Office 3,257,924
Patented June 28, 1966

3,257,924
RANGE FINDER
Friedrich Papke, Braunschweig, Walter Gutmann, Volkmarode, and Friedrich Mische, Braunschweig, Germany, assignors to Voigtlander A.G., Braunschweig, Germany, a corporation of Germany
Filed May 18, 1964, Ser. No. 368,088
Claims priority, application Germany, May 25, 1963, V 24,102
2 Claims. (Cl. 95—44)

The present invention relates to range finders.

More particularly, the present invention relates to range finders which are particularly adapted to be used in photographic cameras.

As is well known, range finders, particularly for certain types of cameras must be accommodated in an exceedingly small amount of space. The light which is received by the range finder is reflected by a reflector of the range finder through a predetermined distance to a semi-transparent reflector of a viewfinder where the range finder and viewfinder rays are combined, as is well known in the art, and because of the small space which is available the distance between the reflector of the range finder and the reflector of the viewfinder is necessarily limited. As a result, when the reflector of the range finder is turned to make adjustments for subjects close to the range finder and distant from the range finder, such as for subjects from a range of one meter to infinity, very small angular adjustments of the reflector of the range finder are required. It becomes necessary therefore to manufacture the range finder with extremely great precision because very small angular movements of the turnable reflector of the range finder will correspond to a relatively large change in the distance between the subject and the range finder, and this requirement of high precision in the manufacture is difficult to provide and very often is a source of trouble in the range finder.

It has already been proposed to eliminate these difficulties by interposing special optical elements in the range finder such as, for example, oppositely movable wedge elements or turnable lenses, so as to provide in this way a substantial increase in the amount of adjustable movement which takes place in connection with the range finder operations, but these measures are quite expensive since they require the use of additional high quality optical elements.

It is accordingly a primary object of the present invention to provide a range finder, particularly for cameras, which avoids the above drawback by providing a range finder structure which is simple and inexpensive to manufacture and which at the same time will have the required precision and will also provide adjustment of elements through a relatively large distance to accommodate relatively large changes in the distance between the subject and the range finder, so that in this way it does not become necessary to provide parts manufactured with a very high degree of precision to enable turning of a reflector through an extremely small distance to take care of relatively large changes in the distance between the subject and the range finder.

It is an object of the present invention to provide a range finder structure which is extremely simple and which is composed of elements which are easy to manufacture as well as to assemble ad adjust.

A further object of the invention is to provide a range finder structure which can readily be adapted for purely manual adjustment, for example, or for automatic adjustment in connection with the focusing of the objective of a camera.

Furthermore, it is an object of the invention to provide a range which is capable of being used with practically any type of viewfinder.

Furthermore, it is an object of the present invention to provide a range finder structure which may be located in very close proximity to a viewfinder and which in fact may be supported by a structure of a viewfinder assembly.

The objects of the present invention also include the provision of a range finder which not only can be supported by the structure of a viewfinder assembly but which can be manufactured with the viewfinder assembly as a single unitary subassembly which can then be introduced into a camera after the entire subassembly is manufactured and assembled.

Also, the objects of the present invention include the provision of a construction which is exceedingly compact so that all of the elements can be accommodated in a surprisingly small space.

Primarily, the present invention resides in providing a turnable reflector means of a range finder with a three-point support which includes three members engaging the turnable reflector means respectively at the corners of a triangle which is situated in a given plane, and an adjustable support means is operatively connected to one of these three members to support it for adjustable movement in a direction substantially normal to the plane of the triangle so as to turn the turnable reflector means about an axis which is determined by the other two of the three members. In this way not only is there achieved in accordance with the invention a three-point supporting structure, which per se is known, but also the supporting structure is used to bring about the adjustable turning movement of the reflector, and in addition the three-point supporting structure of the invention can be used not only for adjusting movements in connection with range finder operations but also for adjusting movements in connection with providing very precise range finder operations, which is to say adjustments to eliminate inaccuracies in the operation of the range finder.

The invention is illustrated by way of example in the accompanying drawings which form part of the application and in which.

Figure 5:
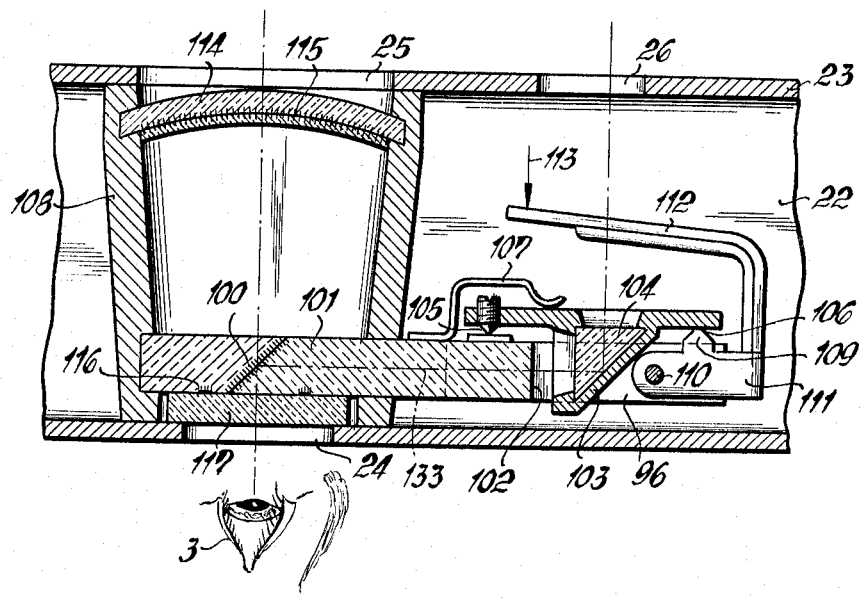
Figure 6:
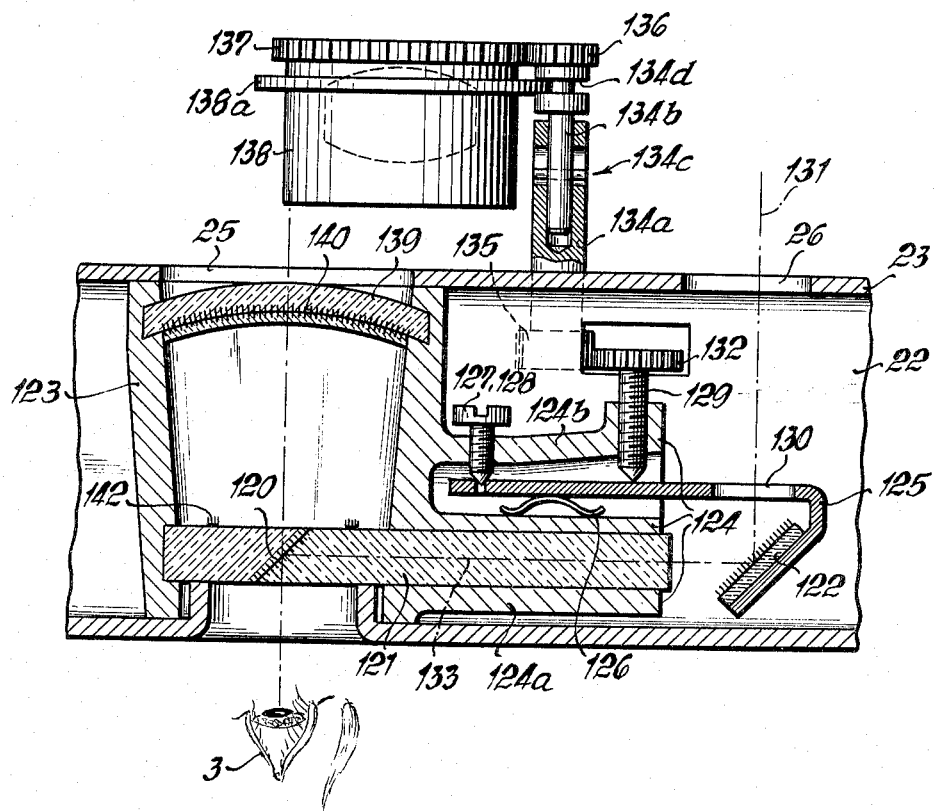

FIG. 5 is a further schematic sectional plan view of yet another embodiment of a range finder and viewfinder assembly of the invention; and FIG. 6 shows a still further embodiment of a range finder and viewfinder assembly according to the invention in a schematic sectional plan view with FIG. 6 showing also the details of one possible transmission from the objective of the camera to the range finder.

Figure 1:
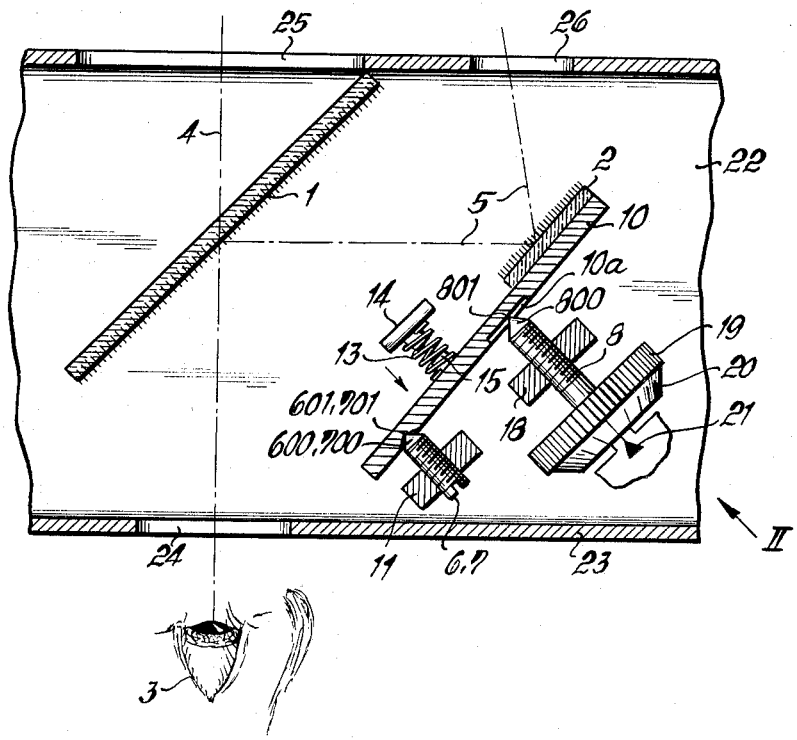
FIG. 1 is a sectional plan view fragmentarily illustrating the interior of a cap which is mounted on a camera housing and schematically showing in a sectional plan view in the interior of the cap one possible embodiment of a manually adjustable range finder according to the present invention.

Referring to FIG. 1, there is illustrated therein a semi-transparent reflector 1 and a turnable reflector means which includes a reflector 2 mounted on an elongated carrier 10. With this construction the eye 3 of the operator will view the subject whose distance is to be measured on the one hand directly along the light ray 4 passing through the semi-transparent reflector 1 and on the other hand by way of the light ray 5 which is reflected to the eye of the operator by the turnable reflector means 2, 10 and the semi-transparent reflector 1. It is to be noted that the reflector 2 is carried by an elongated rigid carrier 10 which has a length considerably greater than the reflector 2, and during operation of the range finder the elongated turns and as a result of its length can have a longer path of turning movement than is possible in a construction where only the reflector itself is mounted for turning movement, as is conventional.

Figure 1A:
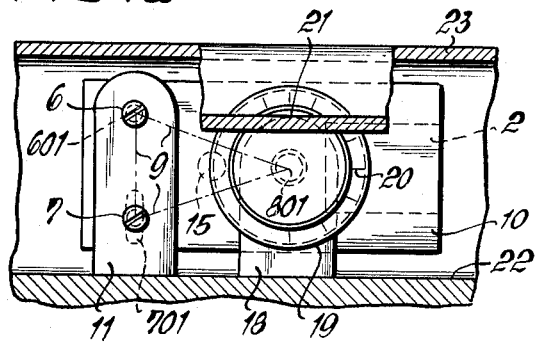
FIG. 1a is a fragmentary sectional elevation of the structure of FIG. 1 as seen in the direction of the arrow A of FIG. 1.

A three-point support means is provided for the reflector means 2, 10, and this three-point support means supports the reflector means by engaging the carrier 10 thereof with three members 6, 7, 8 of the support means which are situated, as indicated particularly in FIG. 1a, respectively at the corners of a triangle which is situated in a given plane which may be a plane in which the elongated carrier 10 is also located, at least substantially. The members 6 and 7 of three-point support means are in the form of turnable screw members which have pointed ends, and the carrier 10 is formed with pointed depressions 601 and 701 which respectively receive the pointed ends of the members 6 and 7. As will be apparent from the description which follows, an adjustable support means supports the member 8 for movement in the direction substantially normal to the plane which includes the triangle at whose corners the members 6–8 are respectively located, so that the reflector means is turned by adjustable movement of the member 8 in a direction normal to this plane about a turning axis which is determined by the pair of members 6 and 7, this axis extending along a straight line between the pointed ends of the members 6 and 7. The pointed depression 601 which is formed in the carrier 10 is of a substantially circular configuration while the pointed depression 701 on the other hand is in the form of an elongated V-groove which receives the pointed end of the member 7, and the length of the groove 701 is particularly apparent from FIG. 1a. A common support member 11 is fixed to the top wall of the camera housing within the hollow cap 23 which is mounted on the camera housing 22 in a manner well known in the art, and this support member is formed with threaded bores through which the members 6 and 7 are respectively threaded. Of course, instead of providing a common support for the members 6 and 7 it is possible to provide individual supporting elements therefor.

A spring means 13 maintains the reflector means 2, 10 in engagement with the members 6–8 of the three-point support means, and in the illustrated example this spring means 13 takes the form of a coil spring which is compressed between a stationary member 14 carried by the top wall of the camera housing 22 and a surface of the carrier 10 where a projection 15 which is fixed to this surface extends into the coil spring 13. Thus, the coil spring 13 urges the carrier 10 in the direction of the arrow shown in FIG. 1 just below the coil spring 13 toward the support members 6–8 so as to maintain the carrier 10 in engagement therewith. The configuration of the triangle 9 at whose corners the elements 6–8 are respectively located is indicated in dot-dash lines in FIG. 1a, and the element 15 is situated approximately at the center of gravity of the triangle so that the spring 13 in this way is compelled to apply its force substantially at the center of gravity of the triangle 9. The member 8 is also in the form of a threaded screw member which has a pointed end 800 terminating in a pointed tip 801 which engages the carrier 10 to determine one corner of the triangle 9, the other two corners of course being determined by the tips of the pointed ends 600 and 700 of the members 6 and 7.

As is apparent from FIG. 1a, the triangle 9 is an isosceles triangle whose base is determined by the support members 6 and 7 and whose apex is determined by the member 8.

This member 8 is threaded through a threaded bore formed in a fixed support member 18 also carried by the camera housing 22 at its upper surface, and in the illustrated example the threaded member 8 has an enlarged head end 19 which is knurled and which is accessible at the exterior of the camera so that it is possible for the operator to manually turn the member 8. As is apparent particularly from FIG. 1a, part of the periphery of the head end 19 of the screw member 8 extends through a suitable aperture which is formed in a stepped portion of the top wall of the cap 23, and in addition the head end 19 carries a scale 20 which is adapted to cooperate with a stationary index 21 carried by the cap 23 at its exterior upper surface in the manner shown most clearly in FIG. 1. During adjustment of the range finder the screw 8 is turned so that the member 8 will be adjusted in a direction which is substantially normal to the plane which includes the triangle 9, and in this way the turnable reflector means 2, 10 will be turned about an axis determined by the members 6 and 7, so that in this way the light ray 5 may be brought into coincidence with the light ray 4. The pointed screw members 6 and 7 serve not only to determine the turning axis of the reflector means, but in addition they are adjustable for the purpose of eliminating any inaccuracies in the range finder so that the structure of the invention is capable of providing a very high degree of precision by proper adjustment of the screw members 6 and 7.

The camera housing 22 carries the hollow cap 23 in a manner well known in the art so that the cap 23 and the camera housing 22 define between themselves a chamber at the upper part of the camera which is adapted to accommodate elements such as a range finder and viewfinder, and this cap 23 is formed along its rear wall with an opening 24 through which the operator can look into the interior of the cap while the front wall of the cap is formed with a pair of openings 25 and 26. The aligned openings 24 and 25 thus serve as a viewfinder while the opening 26 serves to direct the range finder rays 5 to the reflector 2, and thus while viewing the subject through the aligned openings 24 and 25 the operator by turning the knob formed by the head end 19 of the screw 8 can also determine the distance between the subject and the camera.

Figure 2:
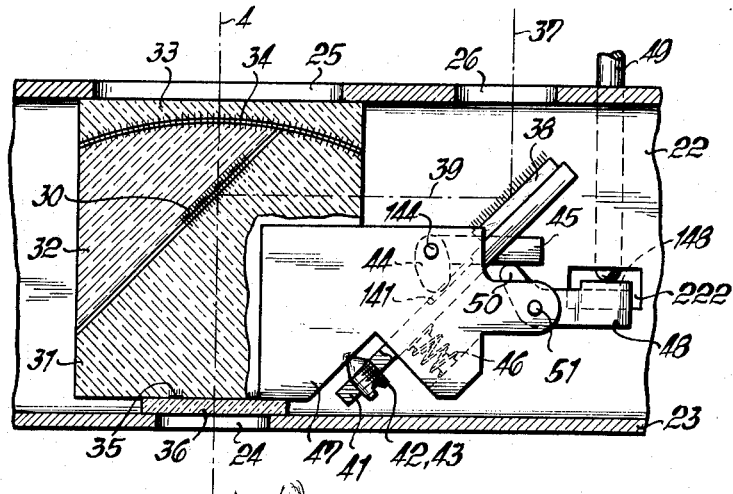
FIG. 2 is a sectional plan view schematically illustrating another embodiment of a range finder according to the invention, this range finder being combined with a block form of Albada viewfinder, and in the embodiment of FIG. 2 structure is shown for adjusting the range finder in response to adjustment of the objective of the camera.

In the embodiment of the invention which is illustrated in FIG. 2 there is a well known block form type of Albada viewfinder combined with the range finder which is provided with the turnable reflector means and three-point support means of the invention. The viewfinder of FIG. 2 includes the semi-transparent reflector 30 at which the range finder and viewfinder light rays are combined, this semi-transparent reflector 30 extending at an angle of 45 degrees across the optical axis 4 of the viewfinder and of course being horizontally aligned with the range finder reflector 38 of FIG. 2. The semi-transparent reflector 30 is cemented in a well known manner at the interface between the blocks 31 and 32 which are united to form a unitary block structure of the viewfinder. This central block assembly 31, 32 of the viewfinder is united at its forwardly directed face with a plano-concave lens 33. At the interface between the block assembly 31, 32 and the lens 33 there is the concave, semi-transparent Albada reflector 34. A frame 35 is situated approximately at the focal plane of the hollow reflector 34 so as to provide in the viewing field of the viewfinder an image of the frame 35 which will indicate to the operator the limits of the viewing field which will be included in the photograph, as is well known in the art, and this frame 35 is mounted, as by vapor deposition, on the inner surface of a glass plate 36 which is cemented toward that surface of the block assembly 31, 32 which is directed rearwardly toward the eye 3 of the operator. The range finder ray 37 is reflected by the range finder reflector 38 along the base 39 to the semitransparent reflector 30 and from there to the eye 3 of the operator.

The reflector means of the embodiment of FIG. 2 includes, in addition to the reflector 38, an elongated carrier 41 which carries the reflector 38 and which has a length considerably greater than that of the reflector 38. In this case also the reflector means 38, 41 is supported by a three-point support means which includes three members which engage the carrier 41 and which are respectively located at the corners of a triangle of the same general configuration as the triangle 9 shown in FIG. 1a. Two of these three members of the three-point support means are formed by the screw members 42 and 43 which are located one above the other and which have pointed ends extending into pointed depressions of a stationary support member 47 which is formed with the pointed depressions which receive the pointed ends of the members 42 and 43, and again the pointed depression which receives the member 42 can be of a circular configuration while the pointed depression which receives the pointed end of the lower member 43 may be in the form of a vertically extending V-groove formed in the support member 47.

In the embodiment of FIG. 2, the third member of the three-point support means is formed by an eccentric cam 44 which engages the front face of the carrier 41 in a suitable elongated groove 141 thereof, and a coil spring 46 is compressed between the rear surface of the carrier 41 and a projection of the support member 47 to urge the carried 41 in a direction which maintains its front surface in engagement with the cam 44 and which maintains the pointed ends of the members 42 and 43 in the pointed depressions of the support member 47, these members 42 and 43 in this embodiment are being threaded through threaded bores which are formed directly in the carrier 41. Of course, the spring 46 applies its force substantially at the center of gravity of the triangle at whose corners the members 42–44 are respectively located, and in this case also an adjustable support means, described below, supports the member 44 for movement substantially in the direction normal to the plane which includes this triangle so as to turn the reflector means 38, 41 about an axis which is determined by the members 42 and 43. The tip of the cam 44 is located in an elongated guiding groove 141 which is formed in the front face of the carrier 41, as pointed out above. The turning of the reflector 38 about the axis determined by the members 42 and 43 enables the range finder light rays to be brought into coincidence with the point where the optical axis 4 intersects the semi-transparent reflector 30. It is to be noted that the pointed ends of the members 42 and 43 extend in one direction while the tip of the cam 44 extends in the opposite direction, and as a result of the action of the spring 46, the carrier 41 is maintained at all times in engagement with the cam 44.

The adjustable support means which supports the cam 44 includes a pin 144 which is turnably carried by the support member 47 in any suitable bearings and to which the cam 44 is fixed. Also fixed to the pin 144 for turning movement therewith is an elongated lever 45. Thus, the cam 44 together with lever 45 form a bell crank which is turnable about the axis of the pin 44. The free end of the lever 45 bears against an arm 50 of a two-armed lever 48 which is supported for turning movement by a pivot pin 51 carried also by the support member 47. In a manner which is well known in the art, focusing of the objective will result in longitudinal movement of the motion transmitting rod 49 which is shown in FIG. 2, and the rear end of the rod 49 bears against the end of the lever 48 which is distant from the end thereof which engages the lever 45, so that in this way when the objective is adjusted the motion will be transmitted from the longitudinally movable rod 49 through the turnable lever 48 to the lever 45 which will in turn cause the cam 44 to turn so as to provide a corresponding turning of the reflector means 38, 41. The rod 49 is located at an elevation lower than the top wall of the camera housing 22, and therefore this top wall is formed with an opening 222 through which a downwardly directed lug 148 of the lever 48 extends to be engaged by the rear end of the rod 49.

The supporting member 47 which thus carries substantially all of the movable range finder structure is fixed to the glass block 31. For example, the support member 47 may be cemented to the exterior surface of the glass block 31. This support member 47 serves as a bearing for the bell crank 44, 45 and for the lever 48. In addition a downwardly directed part of the support 47 is engaged by one end of the spring 46.

In order to adapt the range finder to the particular optical characteristics of the assembly it is possible to provide a suitable adjustment in the transmission of movement between the objective and the range finder. For example, the lever 45 and/or the cam 44 can be connected to the pin 144 in such a way that their angular positions relative to each other can be adjusted. For example, suitable setscrews may fix the lever 45 to the pin 144 in such a way that the angular position of the lever 45 relative to the cam 44 can be adjusted. Also, if desired, the lever 45 can for this purpose be made up of a pair of elements which are adjustably fixed to each other in any suitable way.

Figure 3:
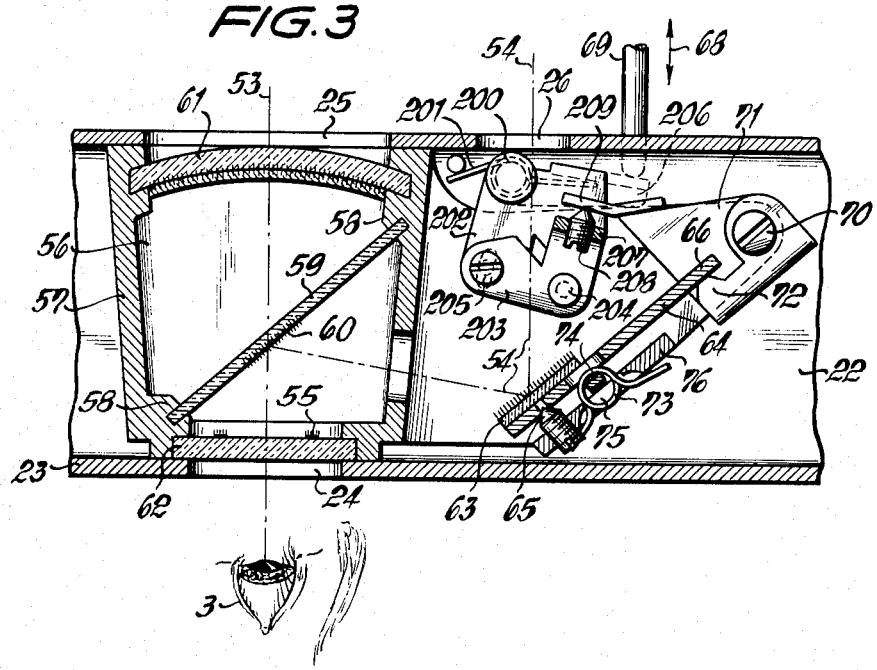
FIG. 3 illustrates in a sectional plan view yet another embodiment of the range finder according to the invention shown in FIG. 2 combined with an Albada viewfinder simpler than that of FIG. 2, and in the case of FIG. 3 also structure is shown for adjusting the range finder in response to adjustment of the objective of the camera.

In the embodiment of the invention which is illustrated in FIG. 3, the range finder of the invention is also combined with an Albada viewfinder to form a unitary assembly therewith. However, in this case instead of a glass block form of viewfinder, a simpler open type of Albada viewfinder is provided. With this construction a relatively large chamber 56 is defined between the front lens 61 and the rear transparent carrier 62 of the frame 55. The hollow concave surface of the lens 61 which is directed toward the interior of the chamber 56 is formed as a semi-transparent meniscus reflector. In this chamber 56 is located a semi-transparent reflector 60. The semi-transparent reflector 60 is mounted, as by vapor deposition for example, on the surface of a transparent glass plate 59 which extends across the chamber 56 and is supported by portions 58 of the wall 57 of the viewfinder housing. The operator views the subject along the optical axis 53 of the viewfinder and the range finder light rays 54 are reflected by the range finder reflector 63 to the semi-transparent reflector 60 as indicated in FIG. 3. The turnable reflector means of the range finder 63 also includes an elongated carrier 64 which carries the reflector 63 and has a length considerably greater than that of the reflector 63. In this embodiment also a three-point support means supports the carrier 64 of the turnable reflector means, and this support means includes a pair of pointed screw members 65 situated one above the other and respectively extending into pointed depressions formed in the rear surface of the carrier 64, so that this part of the structure of FIG. 3 is substantially the same as the part of the embodiment of FIG. 1 which includes the screw members 6 and 7 and the pointed depressions which receive the pointed ends thereof. In the case of FIG. 3 also the carrier 64 is formed with a pointed depression of substantially circular configuration to receive the pointed end of the upper screw 65 while an elongated V-groove receives the pointed of the lower screw member 65. The third member of the three-point support means is formed by a cam 72 which engages the carrier 64 at the region 66 thereof, so that the element 72 together with the pair of members 65 form a triangle corresponding to the triangle 9 shown in FIG. 1a with an adjustable support means, described below, supporting element 72 for movement in a direction substantially normal to the plane in which this triangle is located so as to turn the reflector means 63, 64 about an axis which is determined by the pair of screw members 65. Inasmuch as the mechanical and functional accuracy of the operation of the range finder is determined by the adjustments of the elements 65 which determine the turning axis of the reflector means 63, 64, as pointed out above, it is of advantage to situate this turning axis in the vicinity of the reflector 63, which is to say at the end of the carrier 64 where the reflector 63 is situated. This adjustment for eliminating inaccuracies is substantially identical with that of FIG. 2.

The objective of the camera can be adjusted in the direction indicated by the double-headed arrow 68 shown at the upper right of FIG. 3, and this adjustment is transmitted in a known way to an elongated rod 69 which extends parallel to the optical axis and which through a transmission described below transmits adjustment of the objective to the third member 72 of the three-point support means. The member 72 is in the form of a cam which is fixed to a lever 71 for turning movement with the latter about the stationary pivot 70 which is fixed to the top wall of the camera housing 22. The transmission between the rod 69 and the lever 71 is adjustable for the purpose of adapting the structure to the particular optical characteristics of the assembly, and this transmission includes a plate assembly 202, 203 made up of a pair of plates 202 and 203. The plate 202 of the assembly is supported for turning movement by a stationary pivot 200 carried by the top wall of the camera 22, and a spring 201 is coiled about the pivot 200, engages with one of its ends a stationary pin and with the other of its ends a downwardly directed lug of the plate 202 so that the latter is urged to turn in a counterclockwise direction, as viewed in FIG. 3, about the pivot 200, and of course of the plate 202 is urged to turn with the latter by the spring 201.

A pivot pin 204 pivotally interconnects the plates 202 and 203 with each other, and a screw member 205 extends through an opening of the upper plate 203 and through an arcuate slot of the plate 202 to the underside of the latter where the screw 205 can carry a suitable nut, so that by loosening the nut it is possible to turn the plates 202 and 203 one relative to the other about the pivot 204 so as to adjust these plates relative to each other, and then of course the nut which is carried by the screw 205 can be tightened. The arcuate slot through which the screw 205 extends, extends along a circular whose center is in the axis of the pivot 204. The pivot 200 is supported for turning movement by any suitable bearing structure carried by the top wall 22 of the camera and the plate 202 is fixed to the pivot 200 for turning movement therewith, and the pivot 200 extends into the interior of the camera to which it is also fixed to an elongated lever 206 which bears against the rear end of the motion transmitting rod 69, so that in this way the lever 206 and the plate 202 are fixed to each other for turning movement together about the common axis of the pivot 200, and the spring 201 urges the lever 206 into engagement with the rear end of the rod 69.

The upper plate 203 of the assembly 202, 203 has an upwardly directed lug 207 formed with a threaded bore through which a setscrew 208 extends, and this setscrew has a pointed end which engages an upwardly directed lug 209 of the lever 71. The lug 209 is urged into engagement with the pointed end of the adjusting screw 208 by the action of a spring 73 which is connected with the carrier 64 for urging the reflector means 63, 64 to turn in a clockwise direction, as viewed in FIG. 3, about the turning axis defined by the pair of support members 65, and in this way the portion 66 of the carrier 64 acts on the cam 72 while urging the latter together with the lever 71 in a counterclockwise direction about the pivot 70. It will be noted that the force of the spring 73 opposes the force of the spring 201, and this spring 201 is made stronger than the spring 73 so that the parts will be maintained in this way in their operative positions illustrated in FIG. 3. Thus, whenever the objective is adjusted the motion thereof in the direction indicated by the arrow 68 will be transmitted through the rod 69 to the lever 206 which in turn transmits its turning movement through the pivot 200 to the plate assembly 202, 203 which acts through the adjustable screw 208 on the lever 71 for turning the latter together with the cam 72 so as to act on the reflector means 63, 64 to turn the reflector means about the axis determined by the screws 65.

In the illustrated example, the spring 73 acts, in the manner of the springs of the other embodiments, to maintain the reflector means in engagement with the three-point support means, and in the particular construction shown in FIG. 3 the carrier 64 has a projection 74 which extends through the coiled portion of the spring 73, and a stationary member 76 which carries the adjustable screw member 65 is formed with an opening 75 through which the spring 73 extends with the pair of opposed free ends of the spring 73 pressing against the rearwardly directed surface of the plate 76 so as to urge carrier 64 rearwardly into engagement with members 65 and 72 of the three-point support means. This member 76 is in the form of a stationary substantially rigid member which is located close to and is substantially parallel to the carrier 64 when this carrier is in an intermediate position between its end positions. Of course, the spring 73 opposes the force which adjusts the cam 72 in response to adjustment of the camera objective, so that the position of the reflector 63 is determined in this way by the position of the three members 65 and 72 of the three-point support means. Moreover, these elements 65 enable the structure to be adjusted so as to operate very accurately, as pointed above.

Of course, instead of a compression spring urging the carrier 64 into engagement with the three members of the three-point support means, it is also possible to use a tension spring which pulls the member 64 into engagement with the three-point support means.

The rigid stationary member 76 which carries the members 65 against which the carrier 64 is urged by the spring 73 can form part of a structure which is fixed with the viewfinder housing 57. For example, the viewfinder housing 57 may be formed integrally with or may be fixed in any suitable way to a rigid plate 77 to which the plate 76 is fixed or this plate 76 may simply form an upwardly directed integral part of the plate 77, and in this way it is possible to form a single unit 57, 77, 76 which carries all of the parts of the viewfinder and range finder, including the optical elements, the turnable reflector with its carrier, the necessary levers, bearings, springs, and the like, so that all of these parts may be assembled and adjusted separately from the remainder of the calendar and can be brought practically to a condition ready for use before it is actually mounted in the camera so as to be properly aligned with respect to the optical axis of the objective and to be connected with the drive which transmits adjustment of the objective to the range finder, and then all that is required to complete the assembly is to mount the hollow cap on the top wall of the camera housing. While it is possible to form the elements 57, 77, and 76 of separate elements which are affixed to each other, these elements can be formed of a single unitary structure, as by die casting, for example.

Figure 4:
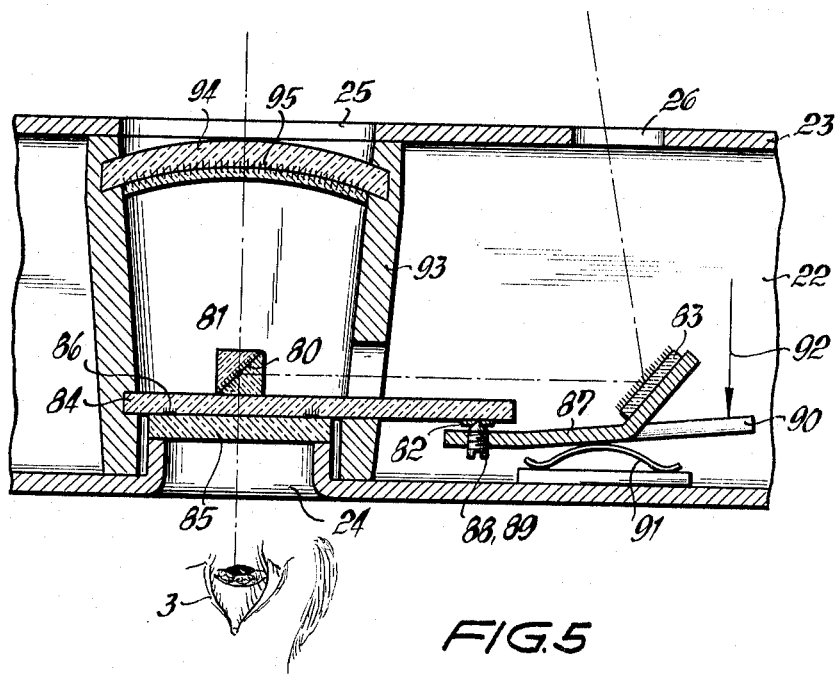
FIG. 4 is a sectional plan view illustrating a very simplified embodiment of a range finder combined with a simple Albada viewfinder, part of the structure of FIG. 4 being shown only schematically.

In the embodiment which is illustrated in FIG. 4, the viewfinder includes a semi-transparent reflector 80 cemented in the interior of an Abbe type cube 81, and this cube 81 is fixed to an elongated transparent glass member 84 which is formed directly with or carries elements which are formed with the pointed depressions which receive the pointed ends of the members 89 of the three-point support means of this embodiment, so that in this way the elongated member 84 provides the required stability between the turning axis of the reflector means 83, 87 and the semi-transparent reflector 80. The elongated transparent glass support member 84 of the embodiment of FIG. 4 also serves as a holder for the transparent plate 85 which carries the frame 86 which is imaged at infinity in the viewing field for indicating to the operator the part of the viewing field which will be included in the photograph. The elongated carrier 87 of the reflector 83 forms together with the latter a turnable reflector means of this embodiment, and it will be noted again that in this embodiment the carrier 87 has a length which is considerably greater than that of the reflector 83. The carrier 87 has the angular configuration which is shown in FIG. 4 and is formed with threaded bores in which the adjusting members 88 and 89 which form two of the members of the three-point support means are located and the pointed ends of these grooves 88 and 89 are received in suitable pointed depressions 82 formed either in the rear surface of the glass member 84 or in suitable members carried thereby.

In this embodiment the third member of the three-point support means is in the form of an elongated rod 92 diagrammatically shown in FIG. 4 as pressing rearwardly against the front face of the carrier 87 which has above its portion 90 the angled portion which carries the reflector 83. The pressure of the motion transmitting rod 92 against the front face of the portion 90 of the carrier 87 serves together with the pressure of the members 88 and 89 in the bearing recesses 82 to provide the three-point support for the reflector means 83, 87. The point of engagement between the rod 92 and the portion 90 as well as the pointed tips of the screws 88 and 89 define the three corners of a triangle which is located in a plane which is substantially perpendicular to the motion transmitting rod 92, and of course the latter is longitudinally moved, in response to adjustment of the objective, in a direction normal to the plane of this triangle so that the reflector means with this embodiment will also turn about an axis which is determined by the members 88 and 89 which can be located at the corners of the base of an isosceles triangle at whose apex the point of engagement between the member 92 and portion 92 is located. A leaf spring 91 is carried by the rear wall of the cap 23 and presses against the rear face of the carrier 87 substantially at the center of gravity of the triangle formed by the three support members 88, 89 and 92, and it will be seen that the force of the spring 91 acts to maintain the portion 90 pressing against the rear end of the rod 92 and the screws 88 and 89 pressing toward the rear surface of the glass support 84. If desired, the housing 93 of the viewfinder can have a rigid integral extension against which the spring 91 presses. It is also possible to form a spring which conforms to the spring 91 by springy portions of the carrier 87 which are struck therefrom and shaped so as to provide springy projections which press against a suitable stationary surface, so that in this way the amount of components required for the assembly can be reduced.

Within the viewfinder housing 93 is again located the front lens 94 which has its hollow concave face directed rearwardly and carrying the semi-transparent reflector 95 of the Albada viewfinder at the focal plane of which the frame 86 is located, and of course the eye 3 of the operator will view both the range finder and viewfinder images along the optical axis of the viewfinder.

In the embodiment of the invention which is illustrated in FIG. 5, the base portion 133 of the range finder light rays extending between the semi-transparent reflector 100 and the reflector 104 of the range finder is situated for the most part in glass. The semi-transparent reflector 100 is cemented at the interface between a pair of portions of an elongated glass member 101 of rectangular cross section, and this glass member 101 extends beyond the viewfinder housing to an extent sufficient to situate its free end 102 closely adjacent to the turnable reflector 104 of the range finder, and in the embodiment of FIG. 5 it will be seen that this turnable reflector 104 is in the form of a prism carried by a suitable frame portion of the elongated carrier 103 which forms together with the reflector 105 the reflector means of the embodiment of FIG. 5. The three-point support means of the embodiment of FIG. 5 includes a pair of members 105 located one above the other and threaded into suitable bores of the elongated carrier 103, these members 105 having rearwardly directed pointed ends extending into pointed depressions formed directly in the glass member 101 or formed in a suitable element carried thereby, and the third member of the three-point support means is formed by the substantially pointed cam 109 which engages the portion 106 of the carrier 103. A leaf spring 107 is fixed directly to the front face of the glass member 101 and presses with its free end against the front face of the elongated carrier 103 substantially at the center of gravity of the triangle defined by the three members 105 and 109 so as to urge the members 105 into the pointed depressions and the portion 106 of the carrier 103 against the member 109 which is of course situated at the apex of an isosceles triangle whose base is determined by the pair of members 105 which also determine the turning axis of the carrier 103, an adjustable support means which is described below supporting the member 109 for movement in a direction substantially normal to the plane which includes the triangle. Thus, the spring 107 may, if desired, be mounted on the viewfinder housing 108 or on any suitable stationary part of the camera.

The adjustable support means for the member 109 takes the form of a lever 111 which is supported for turning movement by a pin 110, and the lever 111 has fixed thereto an elongated extension 112 engaged by a longitudinally movable rod 113 which is diagrammatically indicated and which moves longitudinally in response to adjustment of the objective so as to turn the lever 111 through the extension 112 thereof, and thus displace the member 109 so as to turn the reflector means 103, 104. The pivot 110 for the lever 111 is carried at its ends by a pair of metal members 96 which are fixed respectively to the upper and lower surfaces of the glass body 101 and which extend to the right, as viewed in FIG. 5, beyond the end 102 of the member 101, so that in this way the substantially rigid metal members 96 form an extension of the glass member 101 to support thereon the turnable lever 111 which carries the member 109 of the three-point support means.

It is to be noted that with the structure of FIG. 5 a rearward movement of the rod 113 will result in forward turning of the member 109 while a forward movement of the rod 113 will result in rearward movement of the member 109 and thus the reflector means 103, 104 is turned in opposition to the spring 107 to accommodate a subject which is located relatively close to the camera, assuming that the range finder had previously been adjusted for a subject relatively distant from the camera.

The viewfinder of FIG. 5 again includes a front lens 114 having the configuration of a meniscus and provided at its inner concave surface with a semi-transparent reflector 115 which images the frame 116 at infinity, this frame 116 again being supported by a transparent plate 117 situated at the rear of the viewfinder in alignment with the opening 24 through which the operator can look into the viewfinder.

In the embodiment of the invention which is illustrated in FIG. 6, the base portion 133 of the range finder light rays again extends for the most part through a glass body. In this case also the semi-transparent reflector 120 of the viewfinder, which units the range finder and viewfinder rays, is cemented to the interface between a pair of transparent glass members which includes the elongated glass body 121 of rectangular cross section which extends to a location closely adjacent to the reflector 122 of the reflector means 122, 125 of the range finder of FIG. 6. In this way the base portion 133 of the light rays will necessarily be located for the most part within the glass body 121.

In the embodiment of FIG. 6, however, the viewfinder housing 123 has a multipartite extension 124 made up of the portions 124a and 124b, the portion 124a being tubular and surrounding the glass member 121. The extension 124b serves to carry the three members of the three-point support means which supports the reflector means 122, 125 of the range finder of this embodiment. As is apparent from FIG. 6, the portions 124a and 124b of the extension 124 define between themselves a chamber whose interior is directed toward the range finder light ray 131, and the elongated carrier 125, which carries the reflector 122, again is considerably longer than the reflector 122 and extends into the interior of this chamber into the interior of which the pointed ends of the three support members 127–129 also extend into engagement with the front surface of the carrier 125. It will be seen that the front elongated portion of the carrier 125 makes an angle of approximately 45 degrees with the rear portion thereof to which the reflector 122 is directly fixed. This front longer portion of the carrier 125 forms an elongated tilt-lever formed with pointed depressions for receiving the pointed end of the three-support members 127–129. The spring means 126 is in the form of a leaf spring which presses against the front surface of the tubular extension 124a and against a rear surface portion of the longer leg of the carrier 125, this rear surface portion being situated substantially at the center of gravity of the triangle at whose corners the pointed ends of the members 127–129 are located, this triangle again being an isosceles triangle whose base is determined by the pair of numbers 127 and 128 and whose apex is determined by the pointed end of the member 129, the member 124b being formed with a threaded bore supporting the member 129 for longitudinal movement in a direction substantially normal to the plane in which the triangle is located so that the members 127 and 128 define the turning axis of the reflector means 122, 125. The threaded member 127 is situated directly over the support member 128. A portion of the longer leg of the carrier 125 which projects beyond the chamber defined between the parts 124a and 124b of the extension 124 of the housing 123 is formed with an opening 130 through which the range finder light ray 131 can freely extend to the reflector 122 which is of course mounted at the inner surface of the shorter leg of the carrier 125. The pair of support members 127 and 128 are adjustable from the exterior of the extension 124. The screw member 129, however, carries a gear 132.

The gear 132 is coaxially fixed to the front end of the screw member 129 and forms part of a transmission for turning this screw member 129 in response to adjustment of the objective 138. The transmission between the objective and the member 129 includes, in addition to the gear 132, a gear 135 which meshes with the gear 132 and which is thicker than the gear 132 so that the latter gear can move longitudinally with the screw 129 while remaining in meshing engagement with the gear 135. This gear 135 is fixed to a rotary shaft member 134a which extends into the interior of the camera housing 122 and which forms part of a telescoped shaft assembly. It will be noted that the gear 135 is fixed coaxially to the shaft 134a in the interior of the housing 122 and that the gear 132 extends through a suitable opening formed in the top wall of housing 22 into the interior of the latter into meshing engagement with the gear 135. The telescoped shaft assembly includes in addition to the shaft 134a a shaft 134b which extends slidably into the interior of an axial bore which is formed in the shaft 134a which is supported for rotary movement by any suitable bearing structure, and the shaft 134a is formed at diametrically opposed parts of its axial bore with longitudinal slots which respectively receive the free ends of a cross pin fixedly carried by and extending through and beyond the shaft 134b of the telescoped assembly 134a, 134b, so that in this way a pin-and-slot connection 134c is provided between the members 134a and 134b constraining them to rotate together while at the same time freeing the member 134b, within the limits provided by the length of the slots formed in the shaft 134a, for longitudinal axial movement relative to the shaft 134a. The front end of the shaft 134b has coaxially fixed thereto a pinion 136 which meshes with the toothed periphery of a rotary objective adjusting ring 137, so that this adjusting ring 137 forms a gear which turns the pinion 136 when the ring 137 is turned to adjust the objective 138 in a manner well known in the art.

Thus, when the objective 138 is focused on a particular subject by turning of the ring 137 the pinion 136 and the telescoped shaft assembly 134a–134c will transmit the rotary movement of the ring 137 to the gear 135 which will rotate the gear 132 and thus the rotary screw 129 so as to longitudinally move the latter in the threaded bore of the extension 124b so as to turn the carrier 125 and thus the reflector 122 about the axis determined by the members 127 and 128.

In order to maintain the pinion 136 constantly in meshing engagement with the objective adjusting ring 137, the objective has to the rear of the ring 137 an outwardly directed annular flange 138a which is received at its periphery in an annular groove 134d which is formed in the shaft 134b, so that the shaft 134b is in this way compelled to move axially with the objective. The thickness of the gear 135 is made great enough to maintain this gear 135 in meshing relation with the gear 132 throughout the entire range of longitudinal movement of the latter together with the screw 129. In order to adjust the range finder so as to eliminate inaccuracies the pair of pointed screws 127 and 128 are adjusted in the manner described above, the lower screw 128 being received at its pointed end in an elongated V-groove, for example, formed in the front face of the longer leg of the carrier 125, while the pointed end of the upper screw 127 is received in a pointed depression of circular configuration, as described above.

In order to adjust the transmission between the objective and reflector means 122, 125 so as to properly correlate the reflector means to the objective it is possible to provide an adjustment at any part of the transmission train between the objective and the reflector means. For example, any one of the gears 132, 135 or 136 may be turnable with respect to the member which it is fixed to. Thus, for example, a suitable setscrew may fix the gear 132 to the screw 129 at a given angular position relative thereto so that when such a setscrew is loosened the gear 132 and the screw 129 can be turned one relative to the other so as to adjust the transmission to properly correlate the reflector means and the objective, and in the same way instead of providing such an adjustment between the members 129 and 132 it is also possible to provide such an adjustment either between the gear 135 and the shaft 134a or between the gear 136 and the shaft 134d.

With the construction which is illustrated in FIG. 6 the screw 129 may be adjusted through a relatively large distance in response to focusing of the objective 138, and in order to reduce the distance through which the screw 129 is moved in response to adjustment of the objective it is possible to incorporate into the transmission a known deferential screw arrangement whose output end is located at and forms the rotary screw 129. In this way it is possible to provide a step-down transmission where the telescope shaft assembly can turn through several revolutions to provide a substantially lesser extent of movement of the screw 129.

In the embodiment of FIG. 6, the Albada viewfinder again includes a front meniscus lens 139 aligned with the front opening 25 of the front wall of the cap 23, this front wall also having the opening 26 through which the range finder rays have access to the reflector 122. The concave rearwardly directed face of the lens 139 carries a semi-transparent reflector 140 which serves to image at infinity the frame 142 which in this embodiment, as distinguished from the embodiments of FIGS. 4 and 5, is directly carried by the front face of the elongated glass body 121.

While with all of the embodiments described above, substantially pointed ends of the three members of the three-point support means have been referred to and have been described as extending into pointed depressions either of circular or elongated configuration, it is also possible to practice the invention with members which have substantially rounded tips extending into substantially rounded depressions either of circular or elongated cross section. For example, referring to FIGS. 1 and 1a, the tips of the screws 6 and 7 can be rounded so as to substantially form parts of a pair of spheres, and the depression 601 can also be rounded so as to have the configuration of this sphere while the depression 701 is elongated and is of a substantially U-shaped cross section. Of course, the same variation could be applied to any of the other embodiments of the invention.

While specific embodiments of the invention have been shown and described in detail to illustrate the application of the principles of the invention, it will be understood that the invention may be embodied otherwise without departing from such principles.

What is claimed is:

1. In a camera, turnable reflector means including a reflector and an elongated carrier carrying said reflector, three-point support means supporting said carrier and including three members engaging said carrier and respectively situated at the corners of the triangle which is in a given plane, spring means engaging said carrier and maintaining the latter in engagement with said three members of said support means, viewfinder means having a semi-transparent reflector in which range finder rays and viewfinder rays are united, said viewfinder means including an elongated glass member carrying said semi-transparent reflector and extending therefrom to the region of said reflector carried by said carrier so that light rays between said reflectors travel for the most part in said glass member, said viewfinder means including a housing having a pair of extensions which define between themselves a chamber the interior of which is directed toward range finder light rays which travel toward said reflector which is carried by said carrier before being reflected thereby to said semi-transparent reflector, one of said extensions surrounding and supporting said elongated glass member and the other of said extensions carrying said three members of said support means, said spring means being located in said chamber, and one of said members of said support means being threadedly carried by said other extension to be supported thereby by adjustable movement in the direction normal to said plane for turning said carrier about an axis determined by the other two members.

2. In a camera, turnable reflector means forming part of a range finder, three-point support means supporting said reflector means and including three members respectively located at the corners of the triangle situated at a given plane, one of said members being in the form of a rotary screw, threaded means supporting said rotary screw for axial movement in response to turning thereof, said screw moving in a direction substantially normal to said plane for turning said reflector means about an axis determined by the other two members, a gear coaxially fixed to said rotary screw, a second gear meshing with said first-mentioned gear and carried by one of a pair of elongated telescoped members which are fixed to each other for turning movement together but which are axially movable relative to each other, a third gear fixed to the other of said telescoped members, and an objective having a toothed rotary adjusting member meshing with said third gear, so that in response to turning of said rotary adjusting member of said objective, motion will be transmitted through said gears and telescoped members to said screw member for turning said reflector means.

References Cited by the Examiner
UNITED STATES PATENTS

| | | | |
|---|---|---|---|
| 2,186,806 | 1/1940 | Liebmann | 88—2.4 |
| 2,302,584 | 11/1942 | Steiner | 95—44 |
| 2,317,810 | 4/1943 | Sauer | 95—44 X |
| 2,358,093 | 9/1944 | Luboshez | 95—44 |
| 3,150,579 | 9/1964 | Lange | 95—44 |

JOHN M. HORAN, *Primary Examiner.*